United States Patent
Sorenson et al.

(10) Patent No.: US 7,338,043 B2
(45) Date of Patent: Mar. 4, 2008

(54) METHOD AND APPARATUS FOR FEEDING A DOCUMENT

(75) Inventors: Dustin Sorenson, Austin, TX (US); Kuoyong Huang, Bothell, WA (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 11/021,523

(22) Filed: Dec. 22, 2004

(65) Prior Publication Data
US 2006/0157910 A1 Jul. 20, 2006

(51) Int. Cl.
*B65H 1/00* (2006.01)
(52) U.S. Cl. ..................... 271/162; 399/162
(58) Field of Classification Search ............... 271/9.01, 271/9.05, 9.13, 162, 9.09; 399/377, 365, 399/367; 347/104; 358/498
See application file for complete search history.

(56) References Cited

U.S. PATENT DOCUMENTS

| | | | | |
|---|---|---|---|---|
| D322,626 S | * | 12/1991 | Imai | D18/49 |
| 5,298,937 A | * | 3/1994 | Telle | 355/23 |
| 5,988,622 A | * | 11/1999 | Shigeta | 271/9.01 |
| 6,651,976 B2 | * | 11/2003 | Ohfuchi | 271/145 |
| 6,747,763 B1 | | 6/2004 | Lin | |
| 6,851,670 B2 | * | 2/2005 | Todd | 271/145 |

\* cited by examiner

*Primary Examiner*—Patrick Mackey
*Assistant Examiner*—Jeremy R Severson
(74) *Attorney, Agent, or Firm*—Haynes and Boone, LLP

(57) ABSTRACT

An apparatus for feeding a document includes a chassis, a copying device coupled to the chassis, a feed tray coupled to the chassis and moveable between a first position and second position, a first feed mechanism operable to accept a document from the feed tray and feed the document to the copying device by way of a substantially arcuate path, and a second feed mechanism operable to accept the a document from the feed tray and feed the document to the copying device by way of a substantially linear path. Paper documents may be fed to the copying device from the feed tray in the first position and photographs may be fed to the copying device from the feed try in the second position.

23 Claims, 6 Drawing Sheets

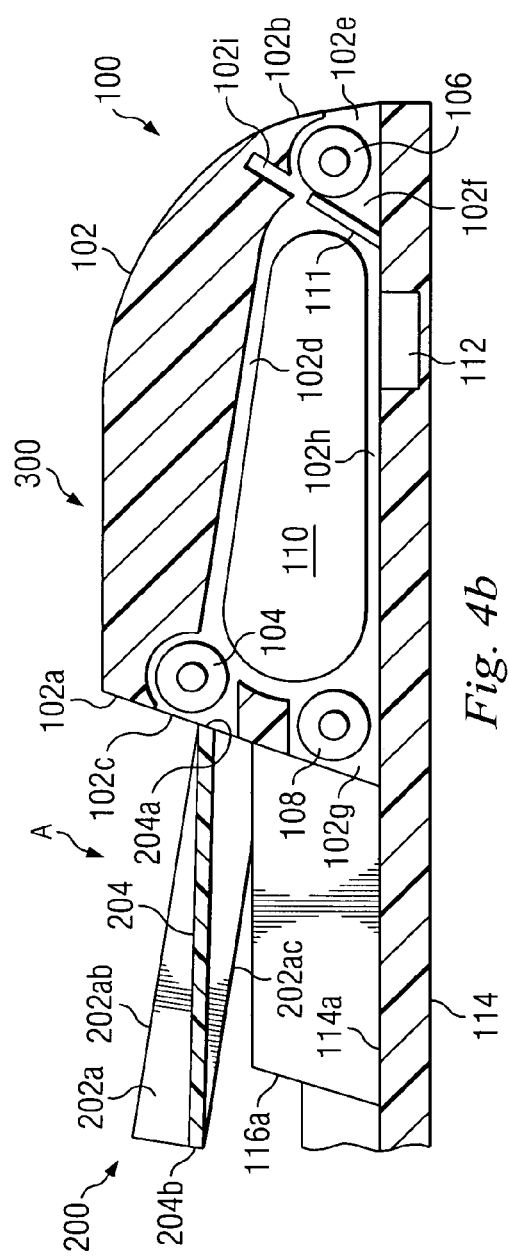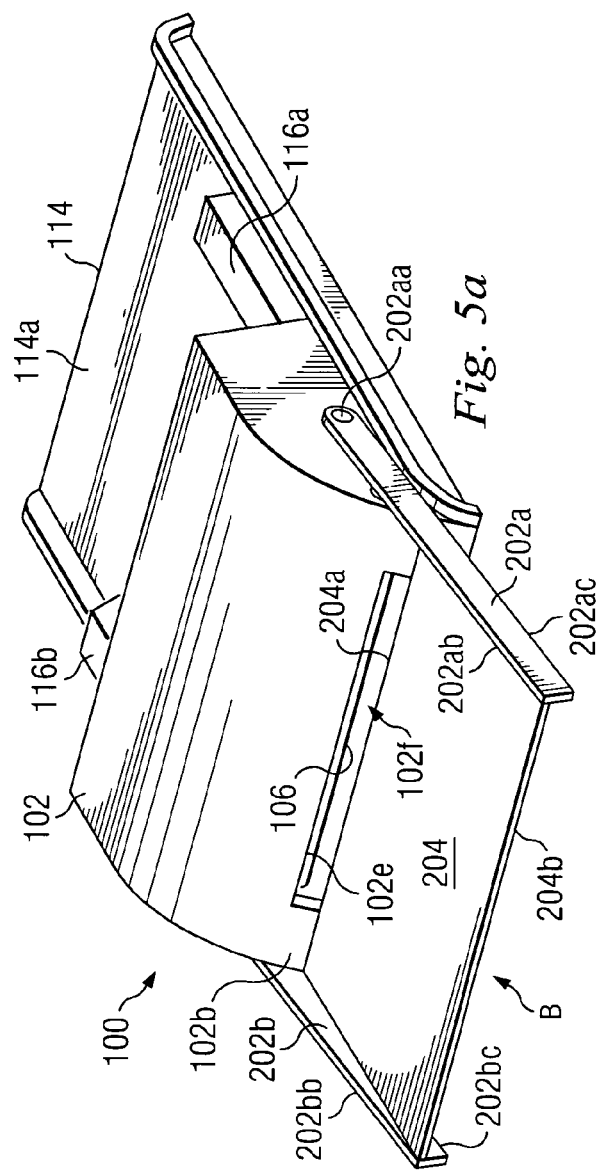

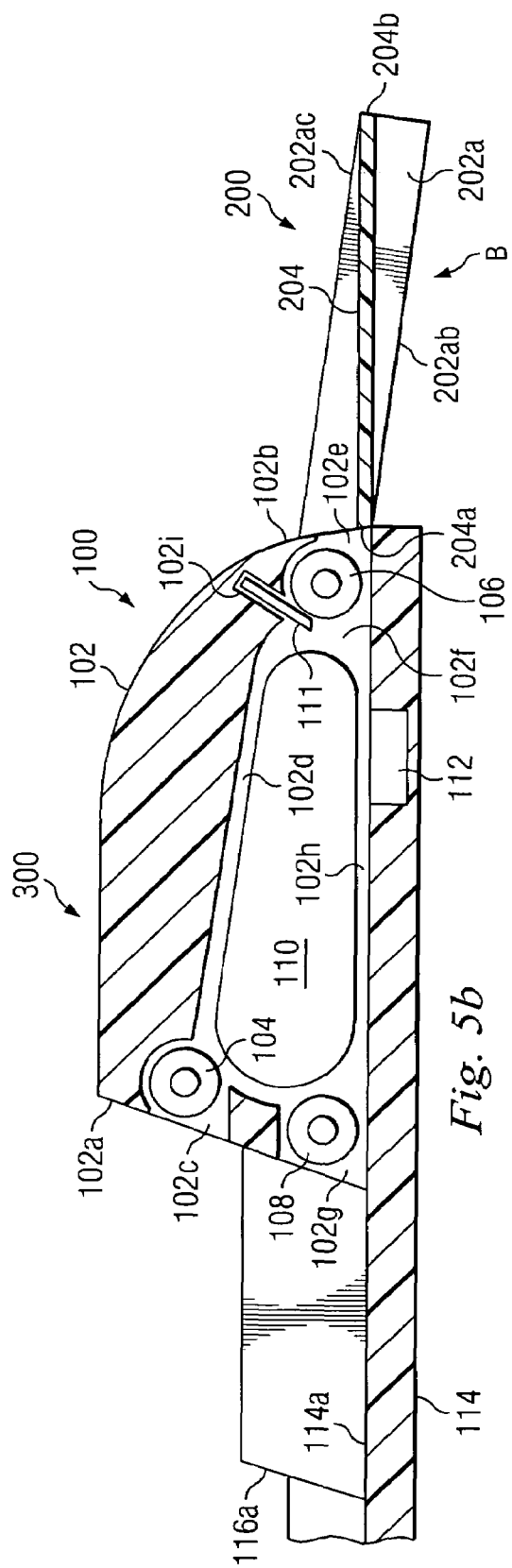
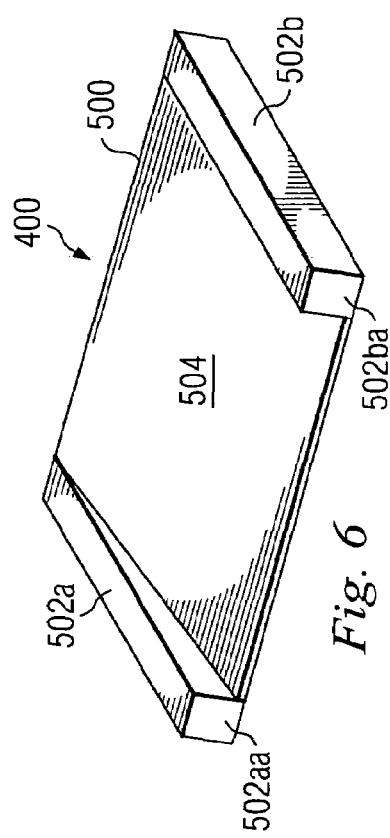
Fig. 5b
Fig. 6

METHOD AND APPARATUS FOR FEEDING A DOCUMENT

BACKGROUND

The present disclosure relates generally to information handling systems, and more particularly to feeding a document.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One of the many applications of an information handling system includes enabling the ability to scan documents into digital formats in order to allow those documents to be stored, edited, copied, and printed. Current devices couple to the information handling system and allow the scanning of documents either by having the document manually placed on the scanner, or by routing the document to the scanner themselves through an automatic document feeder.

The scanning of documents raises a number of issues. Sensitive documents such as, for example, printed photographs, may require careful handling as to not damage them. Placing these sensitive documents manually on current scanners raises the least chance of causing them damage, but results in a very time consuming process.

In order to speed up the process of scanning sensitive documents, the automatic document feeder may be used. However, current automatic document feeders take the document through an arcuate-shaped path which can place the documents in stress and induce a curl in the document, which is very undesirable with sensitive documents such as printed photographs. Furthermore, automatic document feeders use pick/feed mechanisms which have the potential to cause damage to the face of the document they engage such as the image side of a printed photograph.

Accordingly, it would be desirable to provide a method and apparatus for feeding a document absent the disadvantages discussed above.

SUMMARY

According to one embodiment, an apparatus for feeding a document is provided that includes a chassis, a copying device coupled to the chassis, a feed tray coupled to the chassis and moveable between a first position and second position, a first feed mechanism operable to accept a document from the feed tray and feed the document to the copying device by way of a substantially arcuate path, and a second feed mechanism operable to accept the a document from the feed tray and feed the document to the copying device by way of a substantially linear path.

A principal advantage of this embodiment is that regular documents may be scanned in the normal manner, while sensitive documents may be scanned with a reduced risk of damage.

BRIEF DESCRIPTION OF THE DRAWINGS

FIG. 2b is a rear perspective view illustrating an embodiment of the chassis of FIG. 2a.

FIG. 4b is a cross sectional view illustrating an embodiment of the document feeding apparatus of FIG. 4a taken along line 4b.

FIG. 5a is a rear perspective view illustrating an embodiment of the document feeding apparatus of FIG. 4a with the document inlet tray pivoted.

FIG. 5b is a cross sectional view illustrating an embodiment of the document feeding apparatus of FIG. 5a taken along line 5b.

FIG. 6 is a perspective view illustrating an embodiment of a document inlet tray.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
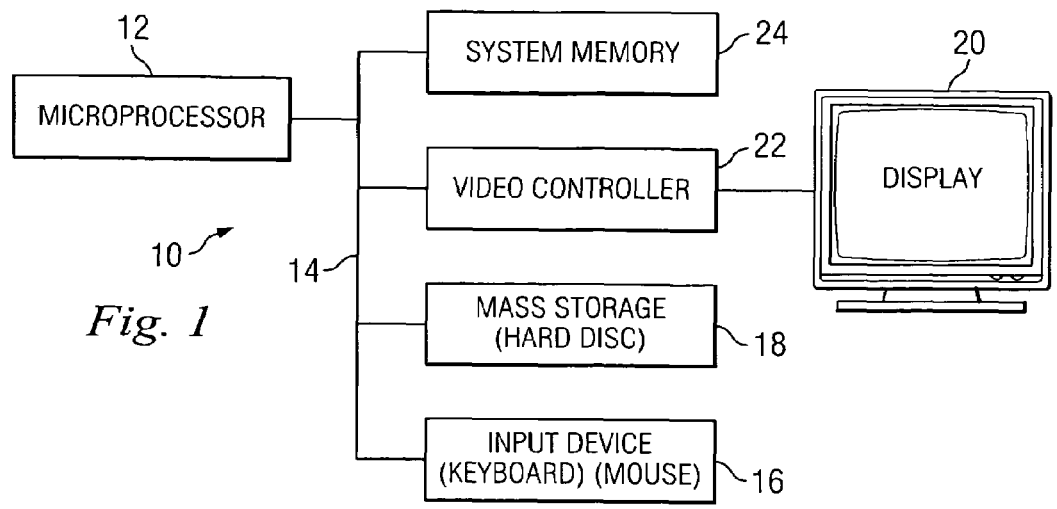
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2A:
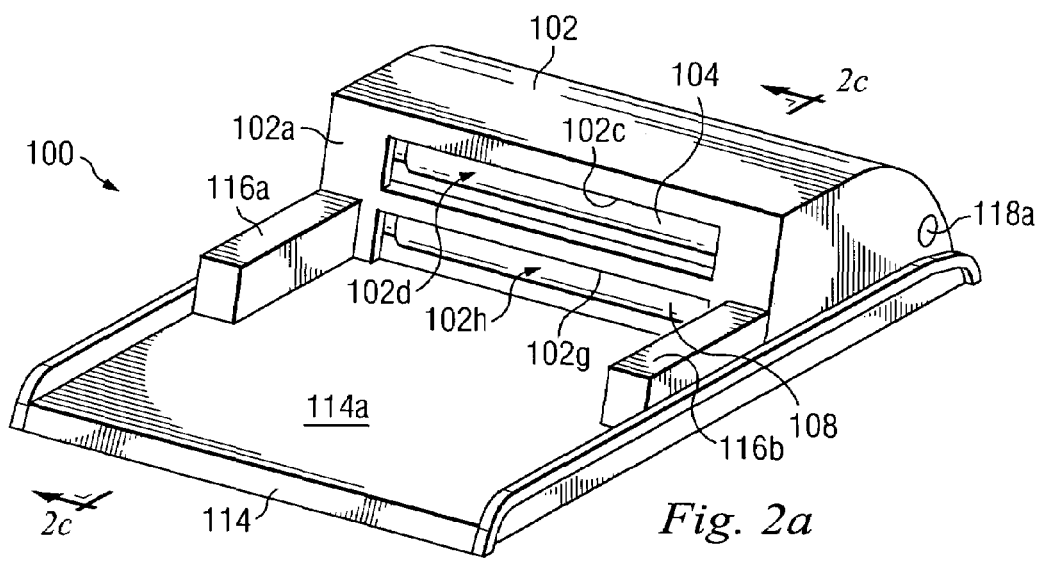
FIG. 2a is a front perspective view illustrating an embodiment of a chassis.
Figure 2B:
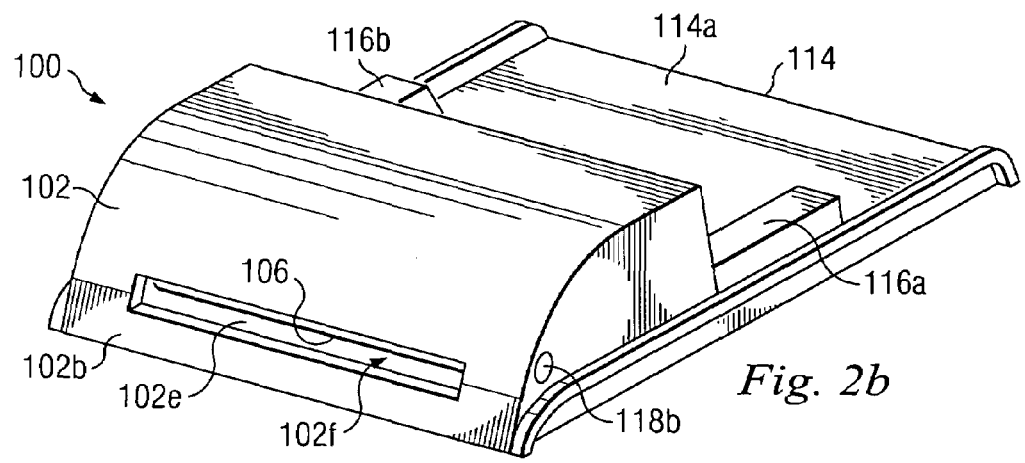
Figure 2C:
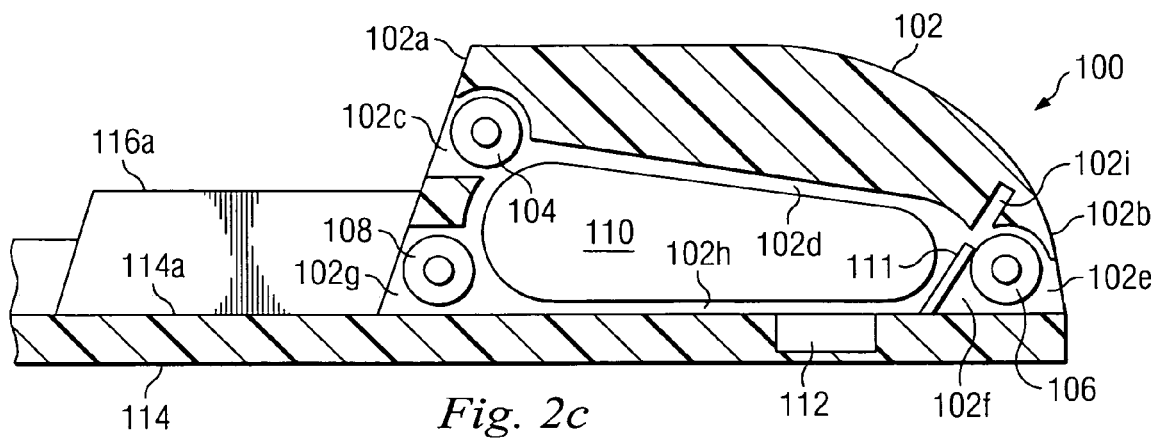
FIG. 2c is a cross sectional view illustrating an embodiment of the chassis of FIG. 2a taken along line 2c.

Referring now to FIGS. 2a, 2b, and 2c, a chassis 100 includes a feed device 102 including a front surface 102a and a rear surface 102b opposite the front surface 102a. An arcuate-path inlet 102c is defined by the feed device 102, positioned on the front surface 102a, and provides access to a arcuate-path passageway 102d which is also defined by the feed device 102. A linear-path inlet 102e is defined by the feed device 102, positioned on the rear surface 102b, and provides access to a linear-path passageway 102f which is also defined by the document feed device 102. A document outlet 102g is defined by the feed device 102, positioned on the front surface 102a, and provides access to a document exit passageway 102h which is also defined by the feed device 102. An access door channel 102i is defined by the feed device 102 and is positioned adjacent the arcuate-path passageway 102d and the linear-path passageway 102f. An arcuate feed drive 104 is coupled to the feed device 102, positioned adjacent the arcuate-path inlet 102c, an includes a conventional pick/feed mechanism known in the art. A linear-path feed drive 106 is coupled to the feed device 102, positioned adjacent the linear-path inlet 102e, an includes a conventional pick/feed mechanism known in the art. A document outlet feed drive 108 is coupled to the feed device 102, positioned adjacent the document outlet 102g, an includes a conventional pick/feed mechanism known in the art. A primary feed drive 110 is coupled to the feed device 102 and positioned adjacent the arcuate feed drive 104, the linear path feed drive 106, and the document outlet feed drive 108. The primary feed drive 110 is also positioned adjacent the arcuate-path passageway 102d, the linear-path passageway 102f, and the document outlet passageway 102h. An access door 111 is moveably coupled to the acess door passageway 102i and positioned adjacent the arcuate-path passageway 102d, the linear-path passageway 102f, and the document outlet passageway 102h. A copying device 112 is coupled to the feed device 102 and positioned adjacent the primary feed drive 110 and the document exit passageway 102h. A document exit tray 114 is coupled to and extends from the feed device 102 and includes a top surface 114a. A plurality of support members 116a and 116b extend from the top surface 114a of document exit tray 114 in a spaced apart relationship, adjacent the front surface 102a of document feed device 102, and on opposite sides of the document outlet 102g. A plurality of coupling members 118a and 118b are positioned on opposite sides of the document feed device 102.

Figure 3A:
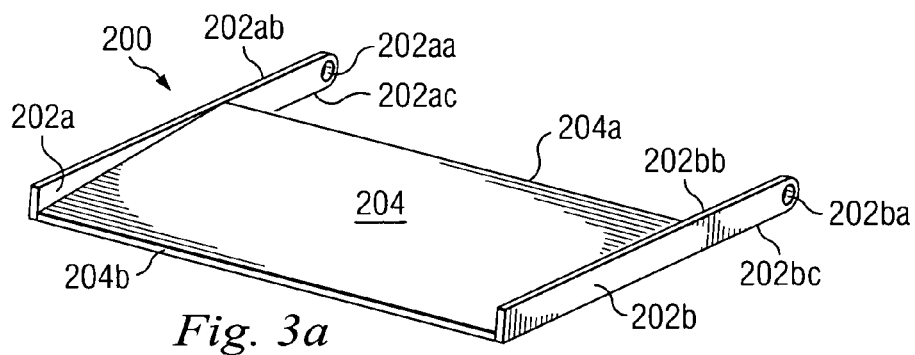
FIG. 3a is a front perspective view illustrating an embodiment of a document inlet tray.
Figure 3B:
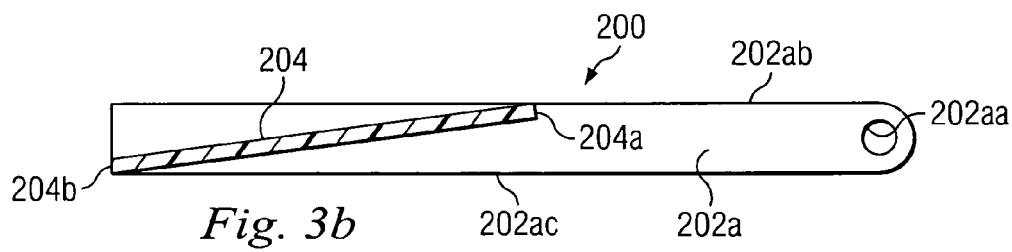
FIG. 3b is a cross sectional view illustrating an embodiment of the document inlet tray of FIG. 3a taken along line 3b.
Figure 4A:
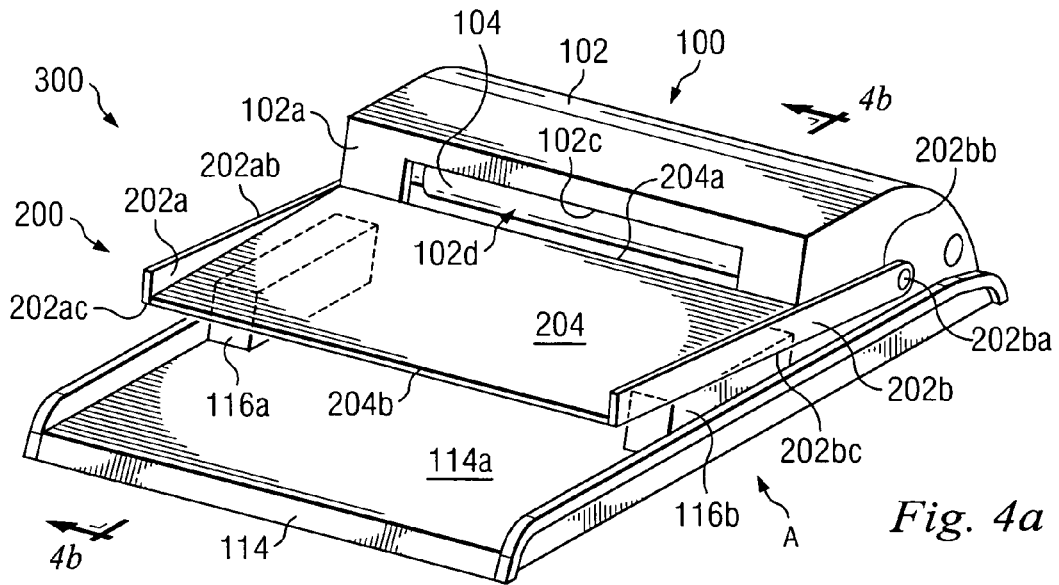
FIG. 4a is a front perspective view illustrating an embodiment of the document inlet tray of FIG. 3a pivotally coupled to the chassis of FIG. 2a and providing a document feeding apparatus.

Referring now to FIGS. 3a and 3b, a document inlet tray 200 includes a plurality of arms 202a and 202b which are substantially parallel to each other, spaced apart, and coupled together by a document support member 204. Arm 202a includes a coupler 202aa on its distal end, a top surface 202ab, and a bottom surface 202ac opposite the top surface 202ab. Arm 202b includes a coupler 202ba on its distal end, a top surface 202bb, and a bottom surface 202bc opposite the top surface 202bb. Document support member 204 includes a end 204a, an end 204b opposite the end 204a, and is coupled to the plurality of arms 202a and 202b such that end 204a is positioned adjacent top surfaces 202ab and 202bb on arms 202a and 202b, respectively, and end 204b is positioned adjacent bottom surfaces 202ac and 202bc on arms 202a and 202b, respectively. As a result, document support member 204 provides support surface between the plurality of arms 202a and 202b.

Referring now to FIGS. 2a, 2b, 3a, 4a and 4b, in operation, the document inlet tray 200 is pivotally coupled to the chassis 100 by positioning the plurality of arms 202a and 202b on opposite sides of the feed device 102 and pivotally coupling the couplers 202aa and 202ba on arms 202a and 202b, respectively, to the coupling members 118a and 118b on feed device 102. The coupling of the document inlet tray 200 with the chassis 100 provides a document feeding apparatus 300. With the document inlet tray 200 pivotally coupled to the feed device 102, the document inlet tray 200 may be pivoted to a position A, with bottom surface 202ac and bottom surface 202bc on arms 202a and 202b, respectively, engaging support members 116a and 116b. In position A, document support member 204 on document inlet tray 200 provides a support surface that is adjacent arcuate-path inlet 102c, and access door 111 extends out of access door channel 102i and blocks document outlet passageway 102h and copying device 112 from linear-path passageway 102f. Documents may then be positioned on the document inlet tray 200 for feeding to the copying device 112 by the document feeding apparatus 300. Documents from the document inlet tray 200 are then fed from the arcuate feed drive 104 to the primary feed drive 110 and through the arcuate-path passageway 102d. In an embodiment, the arcuate feed drive 104 may be engaged and the linear-path feed drive 106 may be disengaged when the document feed inlet tray 200 is in position A. The documents are then guided by the access door 111 in an arcuate path around the primary feed drive 110 and past the copying device 112 into the document outlet passageway 102h. Documents may be converted into a digital format as they are fed across the copying device 112. The documents are then fed by the primary feed drive 110 to the document outlet feed drive 108, out of the document outlet passageway 102h, and onto the top surface 114a of document exit tray 114.

Referring now to FIGS. 2a, 2b, 3a, 5a and 5b, the document inlet tray 200 may be pivoted about the coupling between couplers 202aa and 202ba on arms 202a and 202b, respectively, and the coupling members 118a and 118b on chassis 100 and into a position B. Pivoting document inlet tray 200 into position B results in access door 111 translating along its moveable coupling to access door passageway 102i into access door channel 102i. In position B, document support member 204 on document inlet tray 200 provides a support surface that is adjacent linear-path inlet 102e. Documents may then be positioned on the document inlet tray 200 for feeding to copying device 112 by the document feeding apparatus 300. Documents in the document inlet tray 200 are then fed from the linear-path feed drive 106, through the linear-path passageway 102f, and to the primary feed drive 110. In an embodiment, the linear-path feed drive 104 may be engaged and the arcuate-path feed drive 104 may be disengaged when the document feed inlet tray 200 is in position B. The documents are then guided past the copying device 112 and into the document outlet passageway 102h. Documents may be converted into a digital format as they are fed across the copying device 112. The documents are then fed by the primary feed drive 110 to the document outlet feed drive 108 out of the document outlet passageway 102h and onto the top surface 114a of document exit tray 114.

Referring now to FIG. 6, an embodiment of a document feeding apparatus 400 is substantially identical in design and operation to the document feeding apparatus 300 described above with reference to FIGS. 1, 2a, 2b, 2c, 3a, 3b, 4a, 4b, 5a, and 5b, with the provision of a modified document feed tray 500. Document feed tray 500 includes a plurality of support beams 502a and 502b which are substantially parallel, spaced apart, and coupled together by a document support member 504. Support beams 502a and 502b each include a coupling ends 502aa and 502ba on their distal ends.

Figure 7A:
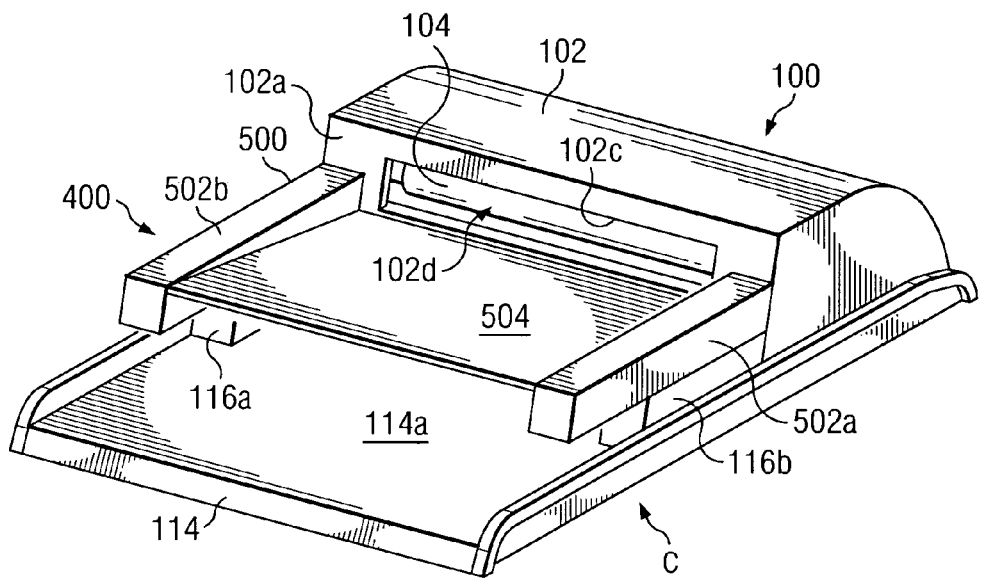
FIG. 7a is a front perspective view illustrating an embodiment of the document inlet tray of FIG. 6 pivotally coupled to the chassis of FIG. 2a and providing a document feeding apparatus.
Figure 7B:
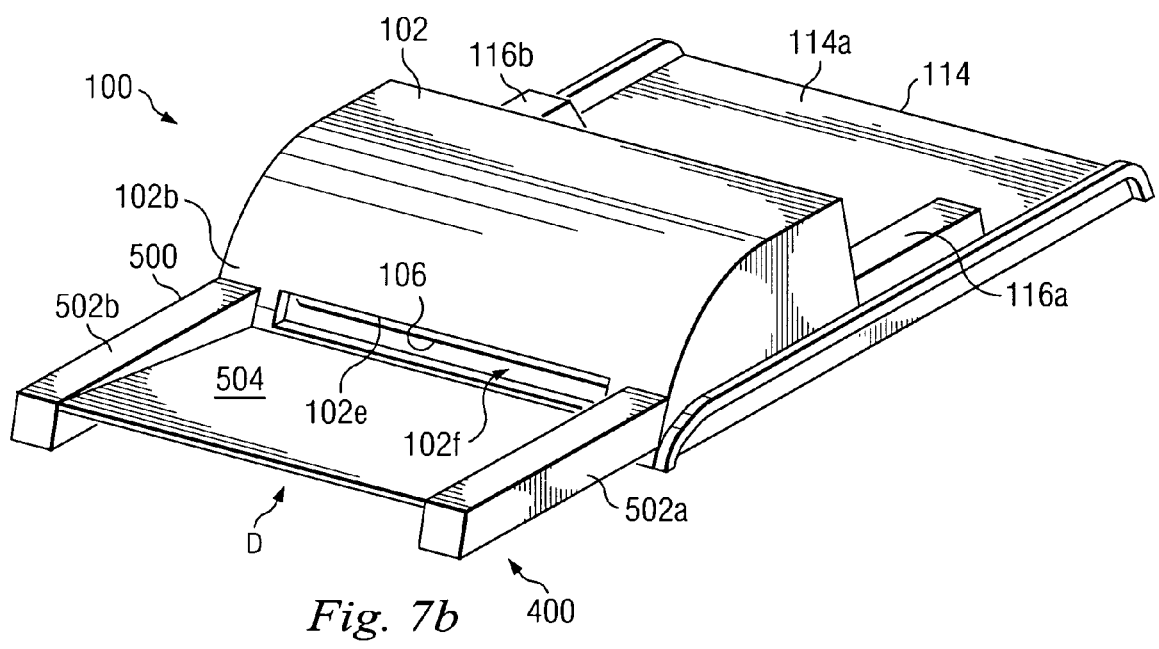
FIG. 7b is a rear perspective view illustrating an embodiment of the document feeding apparatus of FIG. 7a with the document inlet tray pivoted.

Referring now to FIGS. 7a and 7b, in operation, the document feed tray 500 may be coupled to the chassis 100 by coupling the coupling ends 502aa and 502ba on support beams 502a and 502b, respectively, to the front surface 102a of chassis 100 into a position C using conventional method known in the art. In position C, the document feeding apparatus 400 operates in the substantially same manner as the document feeding apparatus 300 in position A, described above with reference to FIG. 4b. The document feed tray 400 may the be decoupled from the front surface 102a of chassis 100 and coupled to the rear surface 102b of chassis 100 into a position D using conventional methods known in the art. In position D, the document feeding apparatus 400 operates in the substantially same manner as the document feeding apparatus 300 in position B, described above with reference to FIG. 5b.

Figure 8:
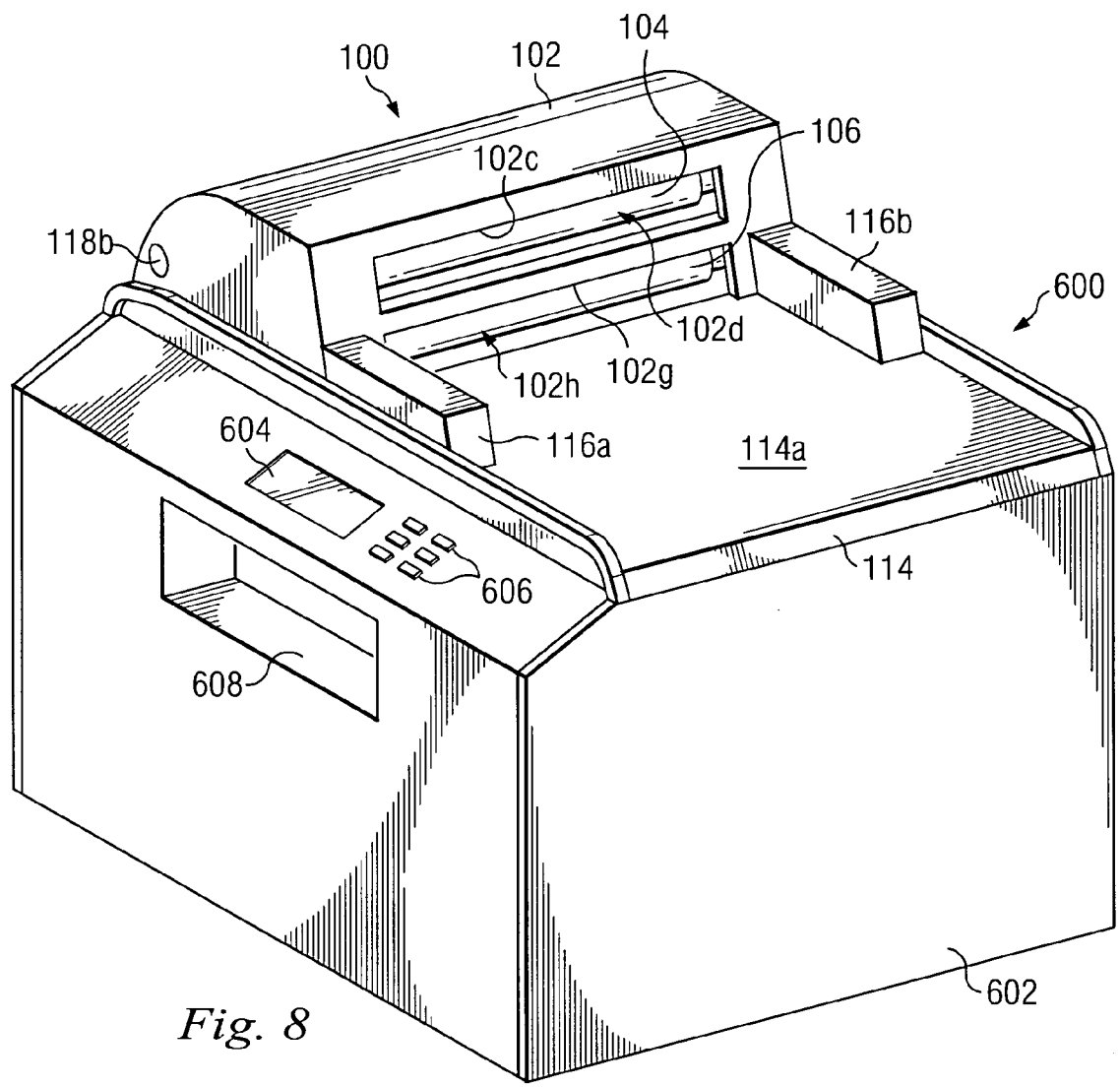
FIG. 8 is a perspective view illustrating an embodiment of the chassis of FIG. 2a coupled to a printing apparatus.

Referring now to FIG. 8, an embodiment of a document feeding apparatus 600 is substantially identical in design and operation to the document feeding apparatus 300 and 400 described above with reference to FIGS. 1, 2a, 2b, 2c, 3a, 3b, 4a, 4b, 5a, 5b, 6, 7a and 7b with the provision of a printing apparatus 602. Printer apparatus 602 includes a display 604 operable to display functions and operation of the document feeding apparatus 600. A plurality of controls 606 are provided to allow manipulation of the document feeding apparatus 600. A copy exit tray 608 is defined by the printing apparatus 602 and provides storage area for copies made by the printing apparatus 602. The document inlet trays 200 or 500 may be coupled to the document scanning apparatus 600 to provide the operation described above. In an embodiment, the document feeding apparatus 600 is operable to provide functions such as, for example, printing functions, copying functions, scanning functions, faxing functions, and a variety of other functions known in the art.

It is understood that variations may be made in the foregoing without departing from the scope of the disclosed embodiments. Furthermore, the elements and teachings of the various illustrative embodiments may be combined in whole or in part some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for feeding a document comprising:
   a chassis having a first document entrance and a second document entrance positioned on an opposite side of the chassis from the first document entrance;
   a copying device coupled to the chassis;
   a feed tray pivotably coupled to the chassis and pivotable between a first position and second position, wherein the feed tray in the first position is adjacent the first document entrance, and the feed tray in the second position is adjacent the second document entrance;
   a first feed mechanism operable to accept a document from the feed tray in the first position and feed the document to the copying device by way of a substantially arcuate path; and
   a second feed mechanism operable to accept a document from the feed tray in the second position and feed the document to the copying device by way of a substantially linear path.

2. The apparatus of claim 1 wherein the feed tray may be decoupled from the chassis and recoupled to the chassis in either the first position or the second position.

3. The apparatus of claim 1 wherein the first feed mechanism is operable to accept a document from the feed tray when the feed tray is in the first position.

4. The apparatus of claim 1 wherein the second feed mechanism is operable to accept a document from the feed tray when the feed tray is in the second position.

5. The apparatus of claim 1 wherein the copying device is operable to convert a document to a digital format.

6. The apparatus of claim 1 further comprising:
   an access member moveable between a closed position and an open position, whereby the access member is in the closed position and operable to guide a document along the substantially arcuate path when the feed tray is in the first position and the access member is in the open position and operable to allow a document to be guided along the substantially linear path when the feed tray is in the second position.

7. A feeding apparatus comprising:
   a chassis defining a first document entrance and a second document entrance that is located on an opposite side of the chassis from the first document entrance;
   a copying device coupled to the chassis; and
   a feed tray pivotably coupled to the chassis and pivotable between a first position and second position, wherein the feed tray in the first position is located adjacent to the first document entrance and the feed tray in the second position is located adjacent to the second document entrance, whereby the first document entrance provides a document from the feed tray in the first position a substantially arcuate path to the copying device and the second document entrance provides a document from the feed tray in the second position a substantially linear path to the copying device.

8. The apparatus of claim 7 wherein the copying device is operable to convert a document into a digital format.

9. The apparatus of claim 7 wherein the first feed mechanism is operable to feed documents to the copying device when the feed tray is in the first position.

10. The apparatus of claim 7 wherein the second feed mechanism is operable to feed photographs to the copying device when the feed tray is in the second position.

11. The apparatus of claim 7 further comprising:
an exit tray coupled to the chassis and operable to accept a document from the copying device.

12. The apparatus of claim 7 further comprising:
an access member moveable between a closed position and an open position, whereby the access member is in the closed position and operable to guide a document along the substantially arcuate path when the feed tray is in the first position and the access member is in the open position and operable to allow a document to be guided along the substantially linear path when the feed tray is in the second position.

13. An information handling system comprising:
a chassis defining a first document entrance and a second document entrance that is located on an opposite side of the chassis from the first document entrance;
a microprocessor coupled to the chassis;
a copying device coupled to the microprocessor;
a feed tray pivotably coupled to the chassis and pivotable between a first position and second position wherein the feed tray in the first position is located adjacent to the first document entrance and the feed tray in the second position is located adjacent to the second document entrance;
a first feed mechanism located adjacent to the first document entrance and operable to accept a document from the feed tray in the first position and feed the document to the copying device by way of a substantially arcuate path; and
a second feed mechanism located adjacent to the second document entrance and operable to accept a document from the feed tray in the second position and feed the document to the copying device by way of a substantially linear path.

14. The system of claim 13 wherein the copying device is operable to convert a document into a digital format.

15. The system of claim 13 wherein the first feed mechanism is operable to accept a document from the feed tray when the feed tray is in the first position.

16. The system of claim 13 wherein the second feed mechanism is operable to accept a document from the feed tray when the feed tray is in the second position.

17. The system of claim 13 further comprising:
an exit tray coupled to the chassis and operable to accept a document from the copying device.

18. The system of claim 13 further comprising:
an access member moveable between a closed position and an open position, whereby the access member is in the closed position and operable to guide a document along the substantially arcuate path when the feed tray is in the first position and the access member is in the open position and operable to allow a document to be guided along the substantially linear path when the feed tray is in the second position.

19. The system of claim 13 wherein the feed tray may be decoupled from the chassis and recoupled to the chassis in either the first position or the second position.

20. A method for feeding a document comprising:
providing a chassis including a copying device and a feed tray moveably coupled to the chassis, the feed tray being pivotably coupled to the chassis and pivotable between a first position and a second position;
providing a first document entrance and a second document entrance for the chassis, the first and second document entrances being in opposite sides of the chassis;
moving the feed tray to the first position adjacent the first document entrance;
accepting a first document from the feed tray by a first feed mechanism;
feeding the first document from the first feed mechanism to the copying device through a substantially arcuate path;
moving the feed tray to the second position adjacent the second document entrance;
accepting a second document from the feed tray by a second feed mechanism; and
feeding the second document from the second feed mechanism to the copying device through a substantially linear path.

21. The method of claim 20 wherein the first document is a paper document.

22. The method of claim 20 wherein the second document is a printed photograph.

23. A method for feeding a document comprising:
providing a chassis including a copying device, a feed tray moveably coupled to the chassis between a first position and a second position, and an access member moveably coupled to the chassis between a closed position and an open position;
moving the feed tray to the first position;
moving the access member to the closed position in response to the feed tray being moved to the first position;
accepting a first document from the feed tray by a first feed mechanism;
feeding the first document from the first feed mechanism to the copying device through a substantially arcuate path and guiding the first document through the substantially arcuate path by the access member in the closed position;
moving the feed tray to the second position;
moving the access member to the open position in response to the feed tray being moved to the second position;
accepting a second document from the feed tray by a second feed mechanism; and
feeding the second document from the second feed mechanism to the copying device through a substantially linear path and allowing the second document through the substantially linear path by the access member in the open position.

* * * * *